(12) United States Patent
Nudda et al.

(10) Patent No.: US 12,109,896 B2
(45) Date of Patent: Oct. 8, 2024

(54) METHOD OF MANAGEMENT OF AN ELECTRIC PROPULSION SYSTEM AND ELECTRIC PROPULSION SYSTEM IMPLEMENTING THE METHOD

(71) Applicant: FPT INDUSTRIAL S.P.A., Turin (IT)

(72) Inventors: Niccolò Nudda, Turin (IT); Mattia Contardi, Turin (IT)

(73) Assignee: FPT INDUSTRIAL S.P.A., Turin (IT)

( * ) Notice: Subject to any disclaimer, the term of this patent is extended or adjusted under 35 U.S.C. 154(b) by 0 days.

(21) Appl. No.: 18/690,264

(22) PCT Filed: Aug. 2, 2022

(86) PCT No.: PCT/IB2022/057147
§ 371 (c)(1),
(2) Date: Mar. 8, 2024

(87) PCT Pub. No.: WO2023/037177
PCT Pub. Date: Mar. 16, 2023

(65) Prior Publication Data
US 2024/0270090 A1  Aug. 15, 2024

(30) Foreign Application Priority Data

Sep. 8, 2021  (IT) ........................ 102021000023192

(51) Int. Cl.
*B60K 6/48* (2007.10)
*B60L 15/20* (2006.01)
(Continued)

(52) U.S. Cl.
CPC ......... *B60L 15/2054* (2013.01); *B60L 15/007* (2013.01); *B60L 50/15* (2019.02); *B60L 2240/486* (2013.01)

(58) Field of Classification Search
CPC ..... B60L 15/007; B60L 15/2054; B60L 50/15
See application file for complete search history.

(56) References Cited

U.S. PATENT DOCUMENTS 8,739,655 B2 * 6/2014 Bologna .................. B60K 1/04
74/661
10,913,460 B2 * 2/2021 Hammarberg ...... B60L 15/2054
(Continued)

FOREIGN PATENT DOCUMENTS

| CN | 112739566 A | * | 4/2021 | ............... B60K 1/02 |
| EP | 2529967 B1 | * | 7/2013 | ............... B60K 1/04 |

(Continued)

OTHER PUBLICATIONS

De Pinto, S., et al. "A four-wheel-drive fully electric vehicle layout with two-speed transmissions." 2014 IEEE vehicle power and propulsion conference (VPPC). IEEE,. (Year: 2014).*

(Continued)

*Primary Examiner* — Cuong H Nguyen
(74) *Attorney, Agent, or Firm* — Bayramoglu Law Offices LLC

(57) ABSTRACT

Electric propulsion system comprising a first and a second propulsion line, operatively connectable individually to a common driving axle, each propulsion line comprising an electric motor, a gearbox comprising at least two gear ratios, a clutch to connect/disconnect the related propulsion line from the driving axle, processing means configured to control the interruption of torque delivery and consequent variation of the transmission ratio first in the propulsion line whose maximum deliverable torque is lower and, at the end of the variation of the transmission ratio, the interruption of torque delivery and consequent variation of the transmission ratio in the other propulsion line.

20 Claims, 5 Drawing Sheets

(51) Int. Cl.
*B60L 15/00* (2006.01)
*B60L 50/15* (2019.01)

(56) References Cited

U.S. PATENT DOCUMENTS

| | | | |
|---|---|---|---|
| 11,007,880 B2* | 5/2021 | Plianos | B60L 15/2009 |
| 11,472,411 B2* | 10/2022 | Hancock | B60K 6/52 |
| 2012/0304790 A1* | 12/2012 | Bologna | B60K 17/08 74/331 |
| 2021/0070181 A1 | 3/2021 | Trost et al. | |
| 2021/0152105 A1 | 5/2021 | Froelich | |
| 2021/0316608 A1* | 10/2021 | Marechal | B60K 17/08 |

FOREIGN PATENT DOCUMENTS

| | | | | |
|---|---|---|---|---|
| FR | 3118729 A1 * | 7/2022 | | B60K 6/36 |
| IT | 202000014236 A1 * | 12/2021 | | B60K 6/48 |
| WO | WO-2020025775 A1 * | 2/2020 | | B60K 1/02 |

OTHER PUBLICATIONS

Mafrici, Salvatore, et al. "Switched Reluctance Machine for transportation and Eco-Design: a Life Cycle Assessment." IEEE Access (Year: 2024).*

Lin, Cheng, et al. "Gearshift control in engagement process of dual-motor coaxial propulsion system for electric bus." IEEE Access 10 (2022): 43351-43366 (Year:2022).*

Satish, Shamith, and Emil Alexsson. "Gear Selection for Dual Electrified Axles with Multiple Electric Machines." (Year: 2024).*

* cited by examiner

METHOD OF MANAGEMENT OF AN ELECTRIC PROPULSION SYSTEM AND ELECTRIC PROPULSION SYSTEM IMPLEMENTING THE METHOD

CROSS REFERENCE TO RELATED APPLICATIONS

This application is a national stage entry of International Application No. PCT/IB2022/057147, filed on Aug. 2, 2022, which is based upon and claims foreign priority to Italy Patent Application No. 102021000023192, filed on Sep. 8, 2021, the entire contents of which are incorporated herein by reference.

TECHNICAL FIELD

The present invention relates to the field of electric propulsion systems, in particular in the field of industrial and commercial vehicles.

BACKGROUND

In the field of commercial and industrial vehicles, massive electrification is underway which sees the replacement of internal combustion motors with electric motors.

However, electric motors have very different characteristics compared to internal combustion motors. Therefore, it is necessary to provide for dedicated control strategies in order to guarantee range, robustness and performance adequate for the purposes.

SUMMARY

The purpose of the present invention is to present a method for managing a propulsion system and a propulsion system that are better or alternative to the known art.

The present invention is based on a propulsion system comprising two parallel propulsion lines which converge on the same driving axle. Each propulsion line comprises in succession, an electric motor, a gearbox and a clutch.

The control of the first propulsion line is independent of the second propulsion line, so that while, for example, the first line is operational, the second can be deactivated or can operate differently from the first line.

Depending on the torque required from the propulsion system and vehicle speed, a processing unit distributes the torque between the propulsion lines.

In some cases, this distribution is not fair and the two propulsion lines work with different transmission ratios and torque values.

As the speed of the driving axle and therefore of the vehicle varies, the operating conditions of the two propulsion lines vary and the simultaneous variation of the transmission ratio on both propulsion lines may be required. However, this involves the interruption of torque delivery by the propulsion system for the time necessary to perform this variation in the transmission ratio.

According to the present invention, to avoid the interruption of the torque delivered by the propulsion system, the transmission ratio is varied sequentially between the two propulsion lines.

In addition, the propulsion line, which remains operational while the other performs the variation in the transmission ratio, delivers the entire torque required to the propulsion system or the maximum torque that can be delivered by the propulsion line itself.

After the first of the two propulsion lines has performed the variation in the transmission ratio, the entire torque required by the propulsion system is delivered by the first propulsion line, while the second performs the variation in the transmission ratio.

According to a preferred aspect of the invention, the first propulsion line that carries out the variation of the transmission ratio is:

Any one of the two, when both propulsion lines have the same maximum torque value that can be delivered, when the variation in the transmission ratio is requested on both propulsion lines, The one that has a lower maximum deliverable torque value between the two propulsion lines, when the propulsion lines have a different maximum deliverable torque, when a variation in the transmission ratio is requested on both propulsion lines.

Although both propulsion lines can be equipped with constructively identical electric motors, the maximum deliverable torque can be different.

This depends on the fact that the maximum deliverable torque is a function of the temperature of the electric motor itself.

It is in fact known that the maximum deliverable torque of an electric motor depends on its electro-mechanical characteristics but also on its operating conditions in terms of temperature, generally of the stator. Therefore, the maximum deliverable (or available) torque may be different even if the motors of the two propulsion lines are constructively identical to each other, since the operating temperature influences the maximum deliverable torque value.

The maximum deliverable torque is calculated dynamically in order to avoid damage to each of the electric motors of the two propulsion lines The dependent claims describe preferred variants of the invention, forming an integral part of this description.

BRIEF DESCRIPTION OF THE DRAWINGS

Further objects and advantages of the present invention will become clear from the following detailed description of an example of embodiment of the same (and its variants) and from the attached drawings given purely for explanatory and non-limiting purposes, in which.

The same reference numbers and letters in the figures identify the same elements or components or functions.

It should also be noted that the terms "first", "second", "third", "upper", "lower" and the like can be used here to distinguish various elements. These terms do not imply a spatial, sequential or hierarchical order for the modified elements unless specifically indicated or inferred from the text.

The elements and features illustrated in the various preferred embodiments, including the drawings, can be combined with each other without however departing from the scope of this application as described below.

DETAILED DESCRIPTION OF THE EMBODIMENTS

Figure 4:
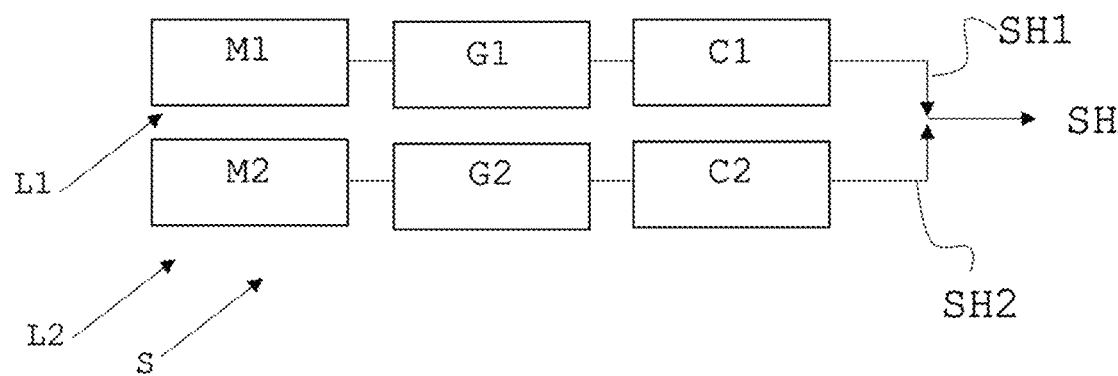
FIG. 4 schematically illustrates the propulsion system according to the present invention.
Figure 5:
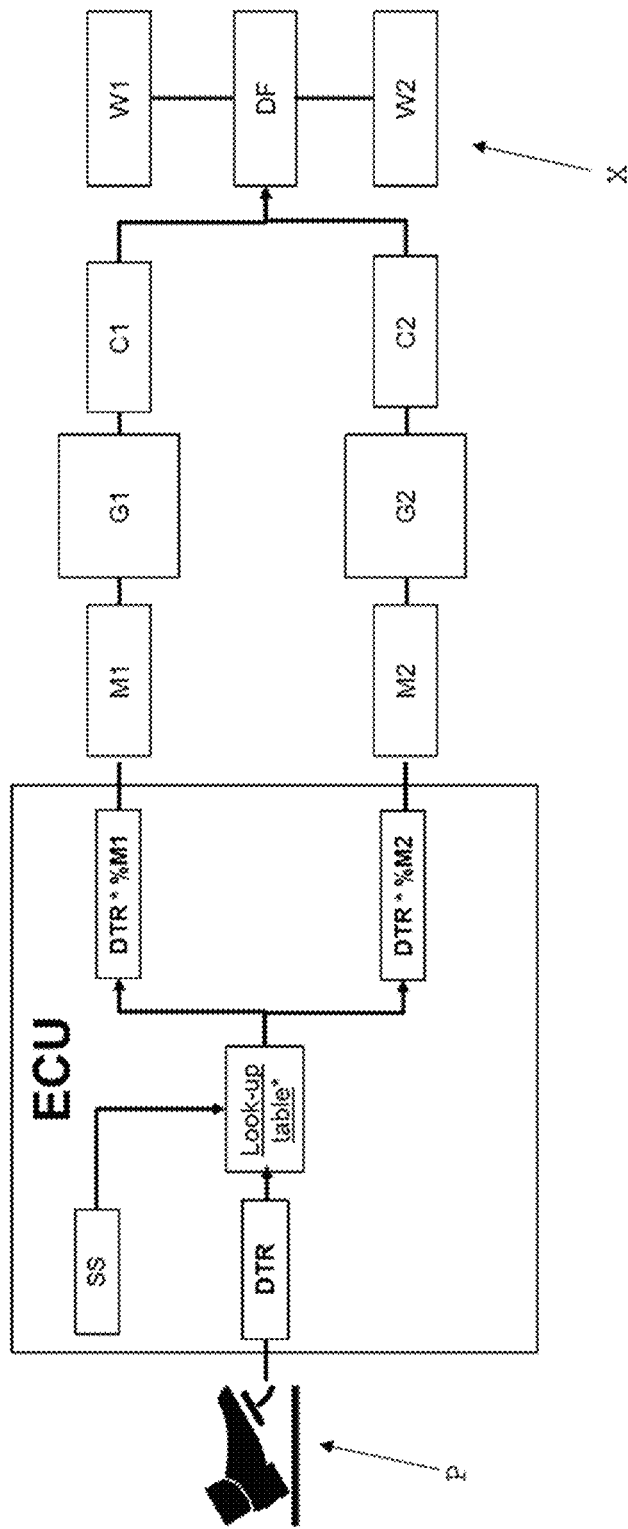
FIG. 5 schematically shows the propulsion system of FIG. 4 with an indication also of the logic functions realized by means of the diagrams of FIGS. 1-3.

With reference to FIGS. 4 and 5, a propulsion system according to the present invention is shown.

The system includes two propulsion lines L1 and L2.

Each propulsion line includes an electric motor generator M1, M2, a gearbox G1, G2 and a clutch C1, C2.

Hereinafter, for convenience, the term "motor" refers to an "electric motogenerator".

Figure 1:
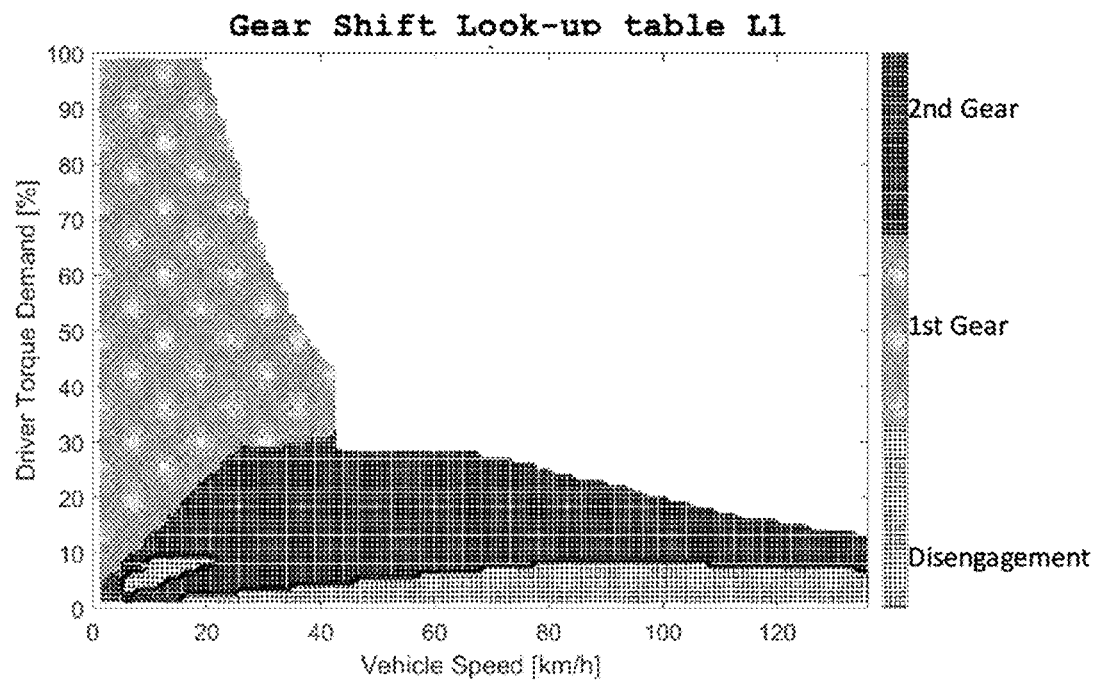
FIGS. 1 and 2 show transmission ratio selection diagrams in relation to vehicle speed and required percentage torque.
Figure 2:
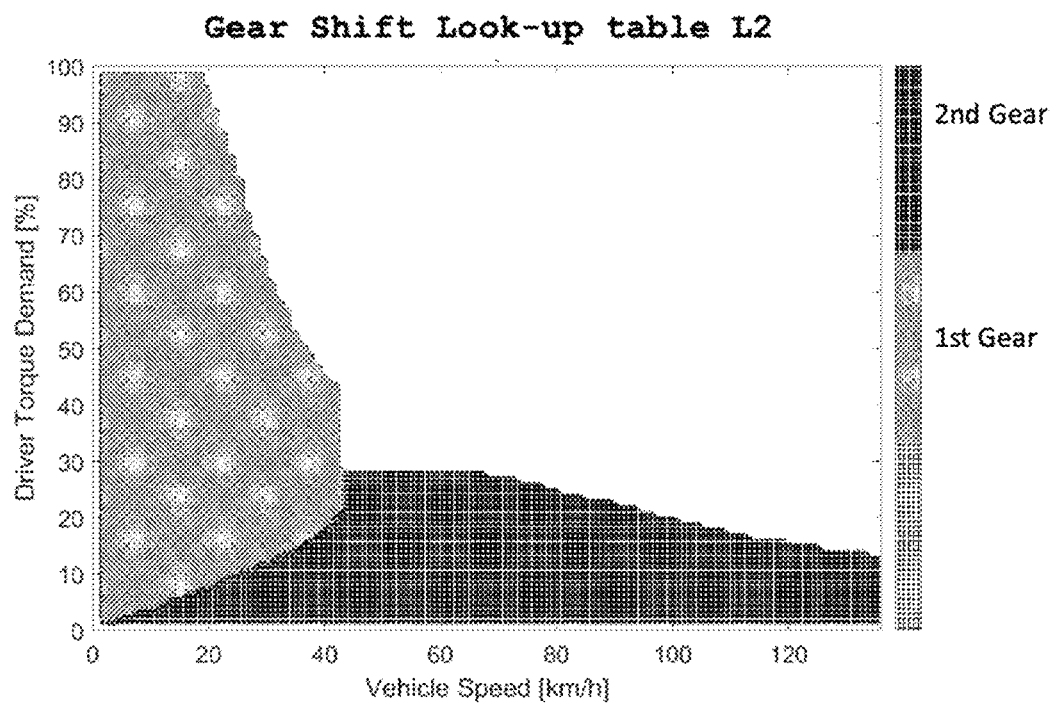

The gearbox G1, G2 has preferably discrete ratios and preferably comprises two transmission ratios, indicated in FIGS. 1 and 2 with "1st Gear" and "2nd Gear", indicating first and second gear respectively.

Preferably, the clutch C1, C2 is made by means of a dog clutch that can be controlled in order to connect or disconnect the respective propulsion line from the driving axle X indicated in FIG. 5.

However, the clutch can be integrated into a gearbox capable of interrupting the connection with the driving axle X as well as selectively selecting a gear ratio between the two or more gear ratios.

Figure 3:
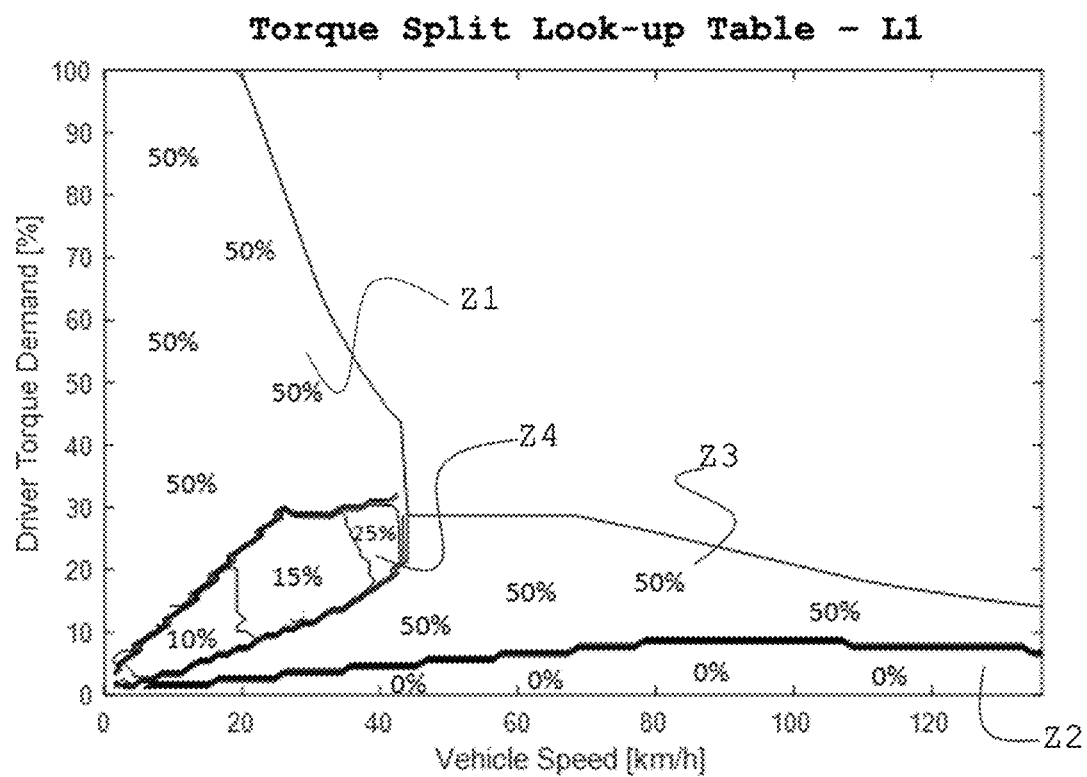
FIG. 3 shows a diagram of distribution of the torque required between the motors of the two propulsion lines.

FIG. 1 also provides for a condition in which the first line L1 is completely disconnected from the driving axle X. This disconnected condition is indicated in FIG. 1 with the label "Disengagement". In FIG. 3, this disconnected condition is indicated with zero torque 0% delivery.

The diagrams in FIGS. 1-3 show areas in the Cartesian plane as a function of the vehicle speed "Vehicle speed" and the torque required "Driver Torque Demand" from the propulsion system. For example, if the maximum torque that each propulsion line can provide is 900 Nm and the driver requires 70% of the maximum torque, then the torque delivered by the propulsion system is 1800*0.7=1260 Nm.

It is evident that the vehicle speed and the rotation speed of the driving axle X are equivalent by a fixed gear ratio. Therefore, it is indifferent to speak about one or the other in the following description.

In FIGS. 1 and 2, the areas are hatched so that each point belonging to the same areas indicates the feasible transmission ratio.

The two diagrams of FIGS. 1 and 2 are very similar to each other and have a vertical area, very close to the ordinate axis, in which the first transmission ratio is engaged and a horizontal area, very close to the abscissa axis, in which the engaging of the second transmission ratio is foreseen. The first diagram differs from the second one in that it includes a third area, contiguous with the abscissa axis, according to which the disconnection of the relative propulsion line is expected.

By observing the diagrams of FIGS. 1 and 2 simultaneously, it can be understood, for example, that for a vehicle speed up to 40 km/h and for torque required greater than 30% of the maximum deliverable torque, the first L1 and the second L2 propulsion line provide for the use of the same transmission ratio, namely the first gear.

Similarly, when the required torque is greater than 10% and the vehicle speed is greater than 40 km/h, the two propulsion lines adopt the same transmission ratio, i.e. second gear.

There are areas where the two propulsion lines adopt different transmission ratios, especially in the torque range between 0 and 30% and in the speed range between 0 and 40 km/h, i.e. in the near area at the origin of the axes.

Under these conditions, one transmission line can adopt the first transmission ratio, while the other adopts the second transmission ratio.

This fact is justified by a different distribution of the driving torque between the two propulsion lines in order to minimize losses, both electrical and mechanical.

FIG. 3 shows the torque split between the two transmission lines. In particular, the diagram is drawn for the first motor M1, therefore, the torque delivered by the second motor M2 of the second propulsion line corresponds to the torque complementary to that required by the first motor M1.

In the same areas where the two propulsion lines adopt the same transmission ratio, they participate equally in the delivery of the driving torque. Instead, where percentage values of 0, 10, 15, 25% are indicated, it means that the first motor delivers 0 or 10, 15, 25% of the required torque, while the second motor M2 delivers respectively and complementarily 100, 90, 85, 75% of the required torque, i.e. the complementary value.

At the same time, the first propulsion line, which delivers less torque than the second propulsion line, implements a higher gear ratio.

This fact leads to optimizing the overall performance of the propulsion system. The discriminating factor for choosing the distribution of the torque between the propulsion lines and the transmission ratios is always the minimization of the sum of the dissipated powers.

According to the present invention, when, following a variation in the control signals, both propulsion lines have to vary the relative transmission ratio, then priority is given to the propulsion line that delivers less torque and subsequently the variation of the propulsion ratio on the other propulsion line. Preferably, during the gear variation of the propulsion line that first performs the gear variation, the other propulsion line delivers the entire drive torque required to the propulsion system, possibly saturated to the maximum torque that can be delivered by the same.

This shift control strategy guarantees reduced discomfort for the driver.

Figure 7:
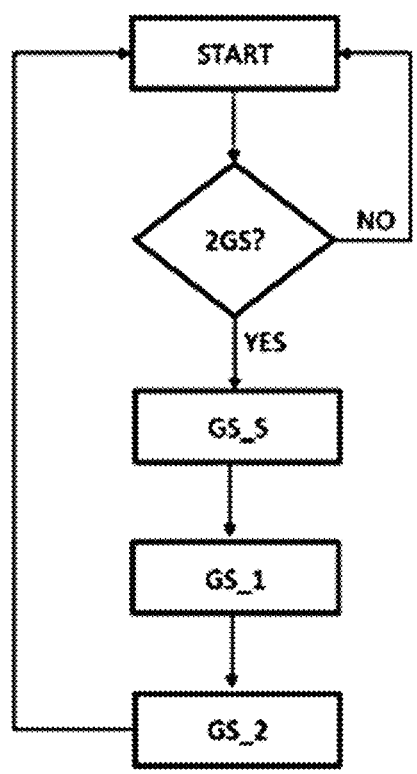
FIG. 7 shows an example of a flow chart representative of a preferred variant of the present invention.

FIG. 7 shows an example of flow chart, exemplary of the present invention.

It envisages cyclically checking, in step 2GS, if the simultaneous variation of the transmission ratio is required on both propulsion lines.

When it comes that the simultaneous variation of the transmission ratio is required on both propulsion lines, then the following steps are carried out in succession:

GS_S step selection of the propulsion line that has the highest deliverable driving torque, when the propulsion lines have a different maximum deliverable driving torque, or one of the two propulsion lines according to a predetermined selection criterion, when the propulsion lines have equal maximum deliverable driving torque;

Step GS_1 delivery of the entire driving torque by the selected propulsion line and variation of the transmission ratio by the other propulsion line;

Step GS_2 delivery of the entire driving torque by the unselected propulsion line and variation of the transmission ratio by the selected propulsion line.

At the end of the variation in the transmission ratio by both propulsion lines, you return to the beginning of the diagram pending a new request for a simultaneous variation in the transmission ratio on both propulsion lines.

If, for example, the first of the two electric motors reach a higher operating temperature, the maximum deliverable torque is reduced although it may be delivering a lower drive torque than the second electric motor at the moment in which the transmission ratio variation signal is generated.

The control strategy of the present invention is particularly advantageous, since this allows the propulsion system to be able to react promptly to the driver's torque requests even during the variation of the transmission ratio on both propulsion lines. In addition, the deactivation of the driving torque delivery by the motor that has lower residual driving torque allows it to cool.

It is evident that the torque delivered by the selected propulsion line is limited to the maximum torque that can be delivered by the propulsion line itself. At the same time, the other propulsion line delivers zero torque, in particular the other propulsion line is controlled exclusively to ensure the synchronization of the gearbox, that is, in order to minimize friction and impact of the operating parts of the gearbox.

When the two propulsion lines are delivering the same driving torque and the simultaneous variation of the transmission ratio is commanded, it is possible to select the line that first performs the variation of the transmission ratio in a random or balanced way, i.e. in order to alternate the precedence between the two lines of propulsion.

According to a preferred variant of the invention, when the required torque is relatively low, for example under a variable threshold and a function of the speed of the vehicle, the first propulsion line is completely disconnected by opening the clutch C1. This fact leads to several benefits:
firstly it allows the second motor M2, which remains operational, to work at an optimal operating point, and
secondly, the field weakening losses are also eliminated, that would occur if a single motor were powered, keeping the other motor mechanically connected to the driving axle.

Indeed, it is planned to adopt permanent magnet electric motors. This fact involves on the one hand having a high specific power, but on the other hand the generation of counter-electromotive force, when the motor is driven into rotation and power disconnected. In fact, this counter-electromotive force involves the generation of a resistant torque which causes a reduction in the efficiency of the propulsion system.

To overcome this resistant torque, it is possible to inject current along the so-called weakening axis, to demagnetize the motor in order to keep the induced voltage across the motor under control. This leads to an increase in the dissipated electrical power.

It is worth highlighting that for low torque delivering, in the diagram of FIGS. 1 and 3, an approximately linear curve is represented that defines the boundary between two contiguous areas that provide for the implementation of the second gear or the "Disengagement" disconnection of the first line L1 of propulsion in FIG. 1 and the delivery of 50% and 0% of the driving torque by the propulsion line L1 in FIG. 3.

With reference to FIG. 3, the table, as a function of a torque required from the propulsion system and a rotation speed of the driving axle X, returns a distribution value of the torque required between the first and second lines and provides
a first zone Z1 contiguous with the torque axis, the torque required by the propulsion system is equally divided between said first and second propulsion lines;
a second zone Z2 contiguous with the axis of rotation speed of the driving axle, the torque required by the propulsion system is generated only by one of the two propulsion lines, while the other is deactivated and disconnected from the driving axle;
a third zone Z3 contiguous with the second zone, the torque required by the propulsion system is equally divided between said first and second propulsion lines;
a fourth zone Z4 delimited by two curves that originate in the origin of the axes, the torque required by the propulsion system is generated unevenly between the two propulsion lines in order to minimize the electrical and mechanical losses of the propulsion system.

It is evident that for particular types of electric motors or transmissions, FIGS. 1-3 may vary, albeit slightly. More specifically, in the case of more than two transmission ratios, the curves would change in the central area, i.e. proximal to the origin of the axes, but the concept of "disengagement" of the area Z2 remains unchanged.

Figure 6:
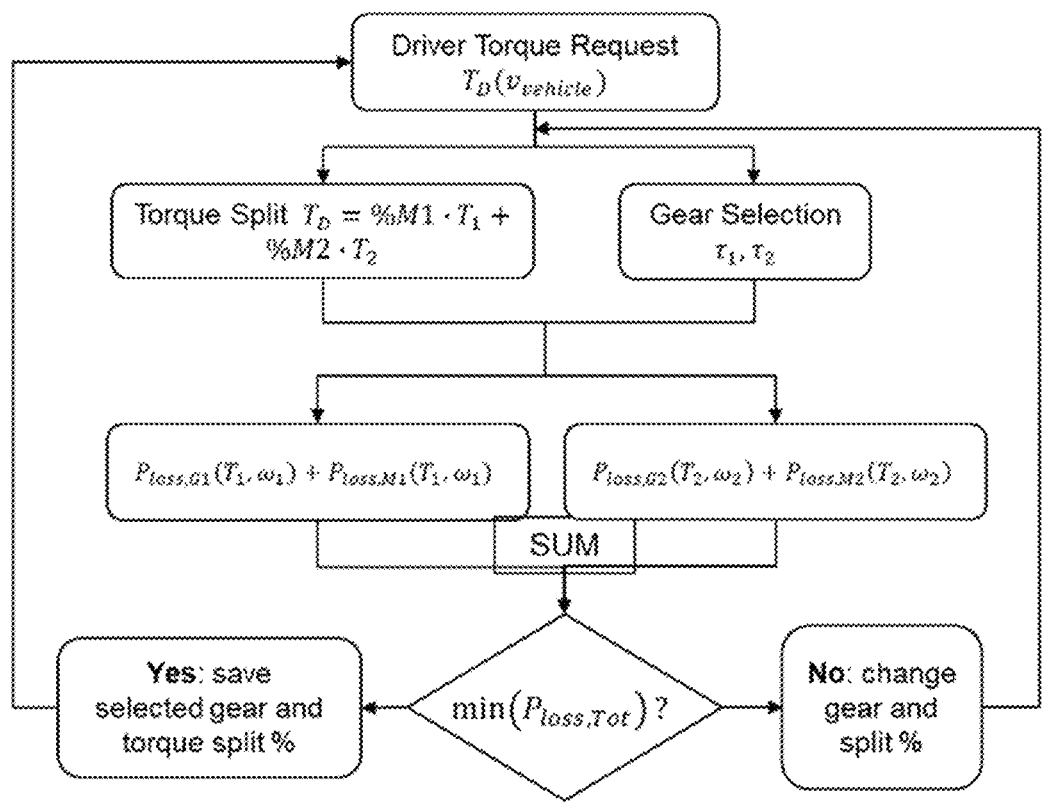
FIG. 6 shows a flow diagram for generating the diagrams of FIGS. 1-3.

FIG. 6 shows a preferred flow chart for generating the "look up tables" of FIGS. 1-3.

It is worth noting that FIGS. 1-3 represent diagrams and at the same time look up tables (or simply tables).

It is important to note that in all the tables, the ordinate axis represents the torque required by the propulsion system.

The required torque varies from 0 to 100% with a predetermined pitch M, for example by one percentage point.

For each value of the required torque, all the possible torque distribution ratios R between the two propulsion lines are considered, for example 0/100, 1/99, 2/98 . . . etc.

It is evident that once the 50/50 distribution ratio is reached, by virtue of the fact that the two propulsion lines are identical to each other, the process stops starting again with another required torque value $T_D$ as long as all the possible torque values, required to the propulsion system, from 0 to 100% have been scanned.

For each of the distribution values R in which both propulsion lines are operational, all possible combinations of transmission ratios are evaluated. When each gearbox has a number N of only 2 transmission ratios, the permutations P are 4, so there is a total of 49×4+1×2 combinations.

In general, the number C of combinations are:

$$\{[(M/2-1)\times 4]+(1\times N)\}.$$

For each of the C combinations, the losses on both propulsion lines are calculated, both of a mechanical nature $P_{loss,G}$, and of an electrical nature $P_{loss,M}$.

It is evident that the losses depend on the rotation speed of the propulsion line. Therefore, these values are obtained for a predetermined number S of discrete vehicle speed values which correspond to the rotation speeds $\omega 1$ and $\omega 2$ of the individual propulsion lines L1 and L2.

Of all the aforementioned values, the one that minimizes the sum of the losses on the entire propulsion system as the vehicle speed varies, is calculated for each speed value.

Through the method just described, the tables of FIGS. 1-3 are produced.

The method can be summarized as follows:
for each required torque value,
for each value of rotation speed of the towing axle,
identification of a predetermined number of distribution ratios of the required torque between the two propulsion lines, all the possible permutations (P) due to the transmission ratios of the two propulsion lines are considered, then
calculation of mechanical and electrical losses and
memorization of the permutation which allows to minimize the sum of mechanical and electrical losses.

FIG. 5 shows a logical-functional diagram of the propulsion system object of the present invention.

The signal relating to the torque required by the driver is acquired by means of an inclination sensor (not shown), associated with the accelerator pedal P. A speed sensor SS is associated with the X axle to measure vehicle speed. The signals generated by the inclination sensor and the speed sensor are sent to a processing unit ECU (Electronic control Unit), operatively connected to said sensors. The processing unit, using the tables in FIGS. 1-3, briefly indicated as "Look-up Table", calculates the partitioning of the torque between the two propulsion lines L1 and L2 (FIG. 3) and the transmission ratios (FIGS. 1 and 2) of both propulsion lines.

In FIG. 5, the block DTR indicates the calculation of the torque required to the propulsion system based on the inclination of the accelerator pedal. Therefore, DTR*% M1 indicates the portion of torque that must be delivered by the first propulsion line L1, while DTR*% M2 indicates the remaining portion of torque that must be delivered by the second propulsion line L2. Evidently DTR*% M2=1−DTR*% M1.

Furthermore, the processing unit, using the diagrams in FIGS. 1 and 2, selects the gear to be used in the G1 and G2 gearboxes, or selects the disconnection of one of the propulsion lines by disengaging the relative clutch.

In other words, the processing unit calculates the torque distribution between the two transmission lines in response to a position of the accelerator pedal and in particular, in response to a variation in the position of the accelerator pedal and/or in response to a variation of the load perceived by the propulsion system, the processing unit can control the simultaneous variation of the transmission ratios of both propulsion lines. In such circumstances the present invention finds particular application.

In the following, the expression "when it is required to vary the transmission ratio of both the first and the second propulsion line" must be understood in the sense that the processing unit carries out the steps of the present invention "in response to a request of variation of the transmission ratio of both the first and second propulsion lines." It is evident that the same processing unit or an additional processing unit can generate the request.

From a hardware point of view, the output shafts of the two propulsion lines L1, L2 converge on the same driving axle X. In particular, the axle includes a central differential DF from which the drive shafts depart driving the wheels W1 and W2.

A preferred aspect of the present invention is the fact of performing the following steps:
Distribution of the torque between the two propulsion lines;
For each propulsion line, based on the torque demand and vehicle speed, the gear ratio or disconnection is selected.

The above steps can be performed in the same succession of listing or simultaneously.

According to a preferred aspect of the invention, the diagram of FIG. 1 is temporarily attributed alternately to the first propulsion line L1 and to the second propulsion line L2. This fact ensures that the transmission lines are subject to the same wear and thermal stress.

When the processing unit calculates a new distribution of driving torque, based on a variation in the inclination of the accelerator pedal and/or the speed of the vehicle, it sends new instructions to the propulsion lines.

The present invention can be advantageously implemented by means of a computer program which comprises coding means for carrying out one or more steps of the method, when this program is executed on a computer. Therefore, it is intended that the scope of protection extends to said computer program and further to computer readable means comprising a recorded message, said computer readable means comprising program coding means for carrying out one or more steps of the method, when said program is run on a computer.

Implementation variants of the described non-limiting example are possible, without however departing from the scope of protection of the present invention, including all the equivalent embodiments for a person skilled in the art, to the content of the claims.

From the above description, the person skilled in the art is able to realize the object of the invention without introducing further construction details.

What is claimed is:

1. An electric propulsion system comprising a first and a second propulsion line, operatively connectable individually to a common driving axle, each propulsion line comprising
an electric motor,
a gearbox including at least two gear ratios,
a clutch to connect/disconnect the related propulsion line from the driving axle,
the system comprising processing means configured to distribute a requested torque between the first and second propulsion lines and to select, for each propulsion line, a relating transmission ratio and wherein when it is requested to vary the transmission ratio of both the first and second propulsion lines, the processing means are configured for commanding:
interruption of the supply of driving torque and consequent variation of the transmission ratio, first in a first propulsion line which has a lower maximum deliverable torque between the two propulsion lines and, at the end of the variation of the transmission ratio, reactivation of the torque delivery of a first transmission line, interruption of torque delivery and consequent variation of the transmission ratio, in the other propulsion line and, at the end of the variation of the transmission ratio, and
reactivation of the torque delivery of the other transmission line.

2. The electric propulsion system according to claim 1, wherein the processing means are configured so that when they control the interruption of the torque delivery of one of the two propulsion lines, they simultaneously control the other propulsion line to deliver the entire requested driving torque, limited to a maximum torque value that can be delivered by a single propulsion line.

3. The electric propulsion system according to claim 1, wherein when it is requested to vary the transmission ratio of both the first and second propulsion lines and both the first and second propulsion lines deliver equal driving torque, then, as propulsion line delivering lower driving torque, one of the two propulsion lines according to a predetermined criterion is selected.

4. The electric propulsion system according to claim 3, wherein the criterion is random or balanced.

5. The electric propulsion system according to claim 2, comprising the following steps in succession:
selection of the propulsion line that has the highest deliverable driving torque, when the propulsion lines have a different maximum deliverable torque, or of one of the two propulsion lines according to a predetermined selection criterion, when the propulsion lines have an equal maximum deliverable drive torque;

delivery of the entire requested driving torque by the selected propulsion line and variation of the transmission ratio by the other propulsion line; and delivery of the entire driving torque by the unselected propulsion line and variation of the transmission ratio by the selected propulsion line.

6. The electric propulsion system according to claim 1, wherein the processing means are configured to differentiate a torque delivered between the first and second propulsion lines to minimize a sum of the mechanical and electrical losses of the propulsion system.

7. The electric propulsion system according to claim 6, wherein the processing means comprise storage means in which one or more tables are stored which are arranged for returning a distribution ratio of the requested torque between the first and second propulsion lines and a relating transmission ratio as a function of the requested torque and a speed of rotation of the driving axle.

8. The electric propulsion system according to claim 6, wherein the storage means comprise a first table in which, as a function of the torque requested to the propulsion system and a rotation speed of the driving axle, it returns a value of distribution of the requested torque between the first and second lines and in which the table is arranged so that, a first zone contiguous with an axis of the requested torque, the torque requested to the propulsion system is equally divided between the first and second propulsion lines;

a second zone contiguous with an axis of the rotation speed of the driving axle, the torque requested by the propulsion system is supplied only by one of the two propulsion lines, while the other propulsion line is deactivated and disconnected from the driving axle;

a third zone contiguous with the second zone, the torque requested by the propulsion system is equally divided between the first and second propulsion lines; and a fourth zone delimited by two approximately linear curves that originate in the origin of the axles, the torque requested to the propulsion system is delivered differently between the two propulsion lines in order to minimize the electrical and mechanical losses of the propulsion system.

9. The electric propulsion system according to claim 1, wherein a residual available torque is a function of electromechanical characteristics of the electric motor of the transmission line and of the current temperature of the electric motor.

10. A method of generating a torque distribution and gear ratio selection scheme for each of the first and second propulsion lines of the propulsion system according to claim 6, wherein, for each requested torque value, for each value of rotation speed of the towing axle, identification of a predetermined number of distribution ratios of the requested torque between the two propulsion lines, considering all possible permutations due to the transmission ratios of the two propulsion lines, calculation of mechanical and electrical losses, and memorization of the permutation which allows to minimize the sum of mechanical and electrical losses.

11. A method for controlling of an electric propulsion system comprising a first and a second propulsion line, operably connectable to a driving axle, each propulsion line comprising:

an electric motor, a gearbox including at least two gear ratios a clutch to connect/disconnect the relating propulsion line from the driving axle, the method comprising a strategy of distributing a requested torque between the first and second propulsion lines and for selecting, for each propulsion line, a relating transmission ratio wherein when it is requested to vary the transmission ratio of both first and second propulsion lines, the method includes the following steps:

interruption of the supply of driving torque and consequent variation of the transmission ratio, first in a first propulsion line which has a lower maximum deliverable torque between the two propulsion lines and, at the end of the variation of the transmission ratio, reactivation of the torque delivery from the first transmission line, interruption of torque delivery and consequent variation of the transmission ratio on the other propulsion line and, at the end of the variation of the transmission ratio, reactivation of the torque delivery of the other transmission line.

12. The electric propulsion system according to claim 2, wherein when it is requested to vary the transmission ratio of both the first and second propulsion lines and both the first and second propulsion lines deliver equal driving torque, then, as propulsion line delivering lower driving torque, one of the two propulsion lines according to a predetermined criterion is selected.

13. The electric propulsion system according to claim 3, comprising the following steps in succession:

selection of the propulsion line that has the highest deliverable driving torque, when the propulsion lines have a different maximum deliverable torque, or of one of the two propulsion lines according to a predetermined selection criterion, when the propulsion lines have an equal maximum deliverable drive torque;

delivery of the entire requested driving torque by the selected propulsion line and variation of the transmission ratio by the other propulsion line;

delivery of the entire driving torque by the unselected propulsion line and variation of the transmission ratio by the selected propulsion line.

14. The electric propulsion system according to claim 2, wherein the processing means are configured to differentiate a torque delivered between the first and second propulsion lines to minimize a sum of the mechanical and electrical losses of the propulsion system.

15. The electric propulsion system according to claim 3, wherein the processing means are configured to differentiate a torque delivered between the first and second propulsion lines to minimize a sum of the mechanical and electrical losses of the propulsion system.

16. The electric propulsion system according to claim 4, wherein the processing means are configured to differentiate a torque delivered between the first and second propulsion lines to minimize a sum of the mechanical and electrical losses of the propulsion system.

17. The electric propulsion system according to claim 5, wherein the processing means are configured to differentiate a torque delivered between the first and second propulsion lines to minimize a sum of the mechanical and electrical losses of the propulsion system.

18. The electric propulsion system according to claim 7, wherein the storage means comprise a first table in which, as a function of the torque requested to the propulsion system and a rotation speed of the driving axle, it returns a value of distribution of the requested torque between the first and second lines and in which the table is arranged so that,

- a first zone contiguous with an axis of the requested torque, the torque requested to the propulsion system is equally divided between the first and second propulsion lines;
- a second zone contiguous with an axis of the rotation speed of the driving axle, the torque requested by the propulsion system is supplied only by one of the two propulsion lines, while the other propulsion line is deactivated and disconnected from the driving axle;
- a third zone contiguous with the second zone, the torque requested by the propulsion system is equally divided between the first and second propulsion lines; and
- a fourth zone delimited by two approximately linear curves that originate in the origin of the axles, the torque requested to the propulsion system is delivered differently between the two propulsion lines in order to minimize the electrical and mechanical losses of the propulsion system.

19. The electric propulsion system according to claim 2, wherein a residual available torque is a function of electromechanical characteristics of the electric motor of the transmission line and of the current temperature of the electric motor.

20. The electric propulsion system according to claim 3, wherein a residual available torque is a function of electromechanical characteristics of the electric motor of the transmission line and of the current temperature of the electric motor.

* * * * *